United States Patent [19]
Kröger et al.

[11] 4,257,090
[45] Mar. 17, 1981

[54] CIRCUIT FOR DEFINED CURRENT SHARING BETWEEN PARALLEL-CONNECTED SWITCHING REGULATOR MODULES IN DC SWITCHING REGULATORS

[75] Inventors: Hans Kröger; Wolfgang Müller, both of Markdorf; Wolfgang Denzinger, Immenstaad, all of Fed. Rep. of Germany

[73] Assignee: Dornier System GmbH, Fed. Rep. of Germany

[21] Appl. No.: 968,444

[22] Filed: Dec. 11, 1978

[30] Foreign Application Priority Data

Dec. 9, 1977 [DE] Fed. Rep. of Germany ....... 2754846

[51] Int. Cl.³ .............................................. H02M 3/22
[52] U.S. Cl. ........................................ 363/65; 363/79; 323/222
[58] Field of Search ................. 363/39, 41, 65, 69–72, 363/78–79; 323/23, 25, 17, DIG. 1

[56] References Cited

U.S. PATENT DOCUMENTS

| | | | |
|---|---|---|---|
| 3,737,756 | 6/1973 | Hasley et al. | 323/17 X |
| 3,824,450 | 7/1974 | Johnson et al. | 323/23 |
| 3,913,000 | 10/1975 | Cardwell, Jr. | 323/17 X |
| 3,931,566 | 1/1976 | Pask et al. | 323/17 X |
| 3,984,799 | 10/1976 | Fletcher et al. | 323/17 X |
| 4,074,182 | 2/1978 | Weischedel | 323/DIG. 1 X |

*Primary Examiner*—William M. Shoop
*Assistant Examiner*—Peter S. Wong
*Attorney, Agent, or Firm*—James E. Bryan

[57] ABSTRACT

This invention relates to an improvement in a circuit arrangement for defined current sharing, between parallel-connected switching regulator modules in DC switching regulators with continuous inductor current and common error amplifiers for the purpose of generating regulated DC voltage from an unregulated voltage source, the improvement comprising means in each switching regulator module, composed of an inductor, a semi-conductor switch, a free-wheeling diode and a pulse-width modulator, whereby for the purpose of controlling the pulse-width modulator a signal proportional to the time-varying inductor current of the individual switching regulator module is negatively fed back to the output signal of the error amplifier, and where the signal resulting therefrom is used to control the pulse-width of the corresponding switching regulator module.

3 Claims, 6 Drawing Figures

CIRCUIT ARRANGEMENT

OPERATIONAL CONDITION: $U_i < U_o$

INDUCTOR CURRENT $i_L$ AS A FUNCTION OF SWITCH S $i_S$ = SWITCH CURRENT
$i_D$ = DIODE CURRENT
$\alpha = T_{in}/T$ 'BUCK' TYPE SWITCHING REGULATOR MODULE ($U_i > U_o$)

'BUCK-BOOST' TYPE SWITCHING REGULATOR MODULE ($U_i \lessgtr U_o$)

SINGLE-ENDED CONVERTER SWITCHING REGULATOR

PUSH-PULL CONVERTER SWITCHING REGULATOR

BRIDGE-CONVERTER SWITCHING REGULATOR

CIRCUIT FOR DEFINED CURRENT SHARING BETWEEN PARALLEL-CONNECTED SWITCHING REGULATOR MODULES IN DC SWITCHING REGULATORS

This invention relates to circuitry for defined sharing of current between parallel-connected switching regulator modules in DC switching regulators being operated with uninterrupted inductor current and controlled by one common error amplifier for the purpose of obtaining a regulated DC voltage from an unregulated voltage source.

Circuits are known in practice, in which a common error amplifier within DC switching regulators can control equal current sharing between parallel switching regulator modules. Such circuitry is based on the premise of operating the individual switching regulator modules with discontinuous inductor current, whereby equal current sharing is forced. Such operation of the individual parallel switching regulator modules however has the drawback that the peak currents in the typical components of the individual switching regulator module and the AC component in the DC currents at the input and output of each switching regulator module are relatively large. Thereby higher rated power semiconductor elements are required on the one hand, and on the other hand higher expenditure in filter elements to smoothen out the AC component in the DC currents are needed.

DC switching regulators are used to power electrical loads at a specific stabilized DC voltage which is generated by the switching regulator module from a non-regulated input DC source being at another voltage level.

The function of such a DC switching regulator is based on the metered periodic interim storage of energy from the input source in an inductor and on the time-controlled transfer of this energy to the electrical load. This metering is implemented in such manner that constant voltage is maintained at the load.

A switching regulator module is defined as consisting of the typical circuit elements of inductor, free-wheeling diode, power switch and pulse width modulator. Various arrangements of these elements with respect to each other or in combination with other circuit elements result in various types of switching regulator modules with different characteristics.

A usual mode of operating switching regulator modules is to run them with a continuous inductor current $i_L$. This means that under load the following relation is valid $$i_L(t) \neq 0 \text{ for } t \geq 0 \leq \infty$$

The switching regulator module is so controlled by the output signal $U_c$ of the error amplifier EA that the output voltage $U_o$ remains in a constant ratio to a fixed and predetermined reference voltage $U_{ref}$, so that a constant output voltage is assured. This is made possible by the output signal $U_c$ setting by means of the pulse width modulator PWM of the switching regulator module a definite duty cycle $\alpha$, namely $$\alpha = f(U_c) = T_{in}/T = f(U_o/U_i)$$

in the power switch S, where $T_{in}$ is the time the switch is closed and T is the period of the switching frequency.

For this mode of operation, employing a continuous inductor current, the DC current component $\bar{i}_L$ of the current $i_L(t)$ of a single-module switching regulator is uniquely determined by the current required by the electric load at the output of the switching regulator, i.e., $$\bar{i}_L \neq f(\alpha) \neq f(U_c).$$

When several switching regulator modules of the same type are connected in parallel in one switching regulator without special circuitry precautions, then there is $$i_{\overline{L1}} \neq i_{\overline{L2}} \neq \ldots \neq i_{\overline{Ln}} \neq f(U_c)$$

This would require to size each individual switching regulator module for overall power, so that a parallel connection for reasons of power appears to be meaningless.

These being the facts, the invention addresses the problem of creating a circuit allowing a parallel connection of switching regulator modules with continuous inductor current in such a form that statically and dynamically equal current sharing is reliably accomplished.

The invention offers a special advantage in that introduction of a negative feedback of the inductor current in each switching regulator module allows connecting these in parallel and operating them with continuous inductor current. It matters little in this regard to what type of switching regulator this circuitry is applied. This circuitry is usable with all switching power supplies and with various electronic DC converters. In particular where high electric power levels are to be realized, and if it is technically difficult or economically inefficient to run the entire power in a single switching regulator module, a parallel operation of several modules accordingly will be more advantageous.

A further advantage is offered because the negative feedback is obtained from the inductor current, which is present without discontinuity, and which determines the electrical load of the typical components of the modules. The result of this is that the negative feedback and therefore the single module current amplification so determined, is effective at all times, so that there are controlled loading conditions of the module components even in the presence of dynamic operating conditions.

This applies to all types of DC switching regulators operating with a continuous inductor current.

The invention will be further illustrated by reference to the accompanying drawings, in which.

Figure 1:
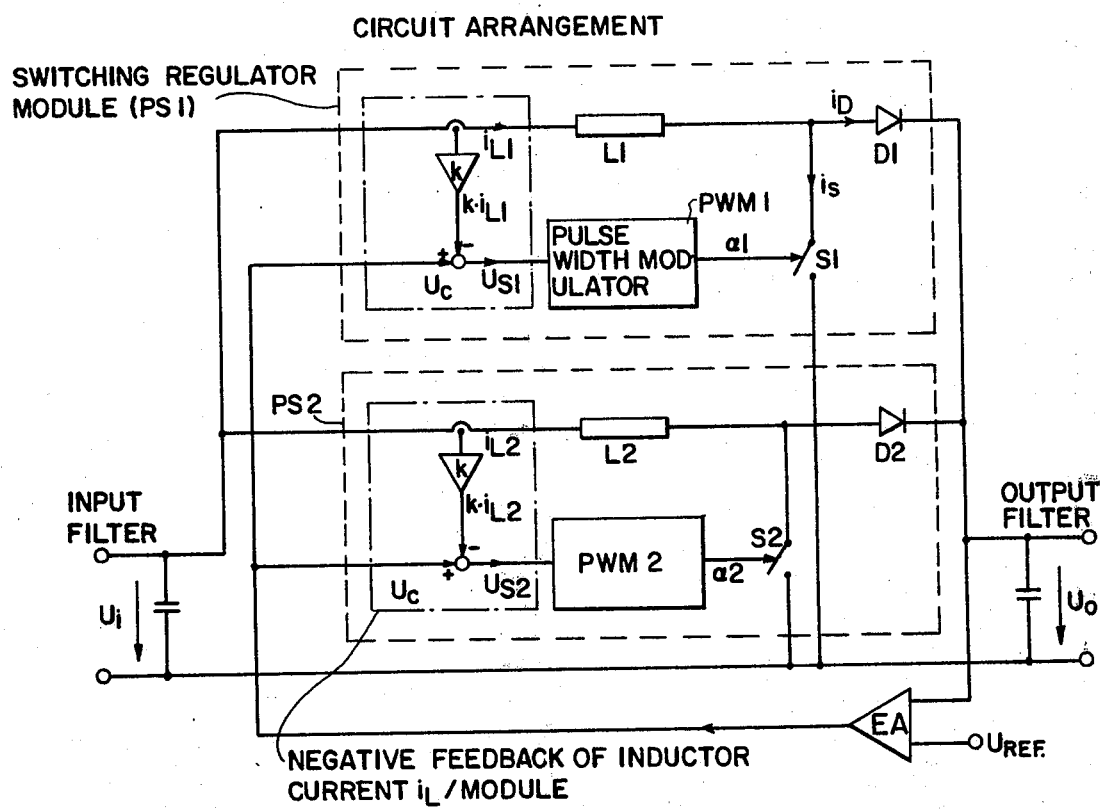
FIG. 1 is a circuit for parallel operation of two switching regulator modules of the "boost" type with a common error amplifier.
Figure 1:
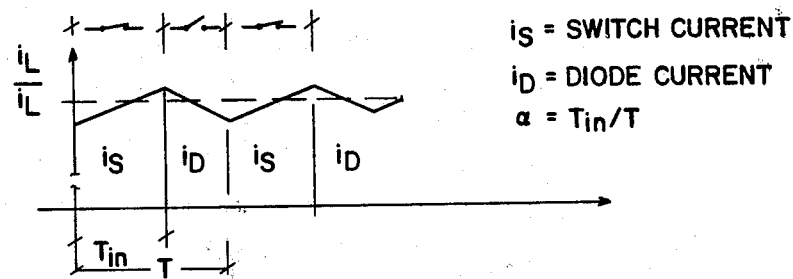
Figure 2A:
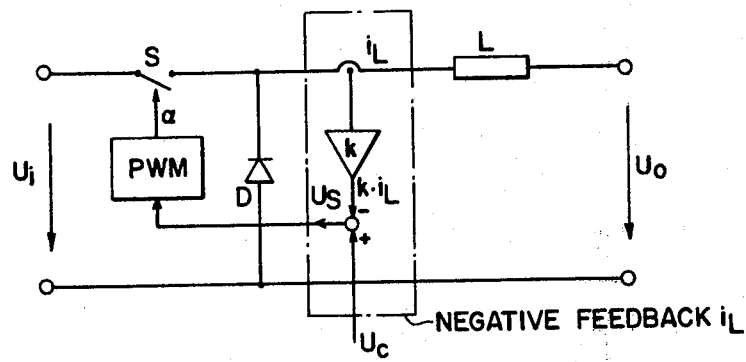
FIGS. 2a, 2b and 3a, 3b and 3c are circuit arrangements showing the use of negative feedback of the inductor current within switching regulator modules for parallel operation in other types of switching regulators.
Figure 2B:
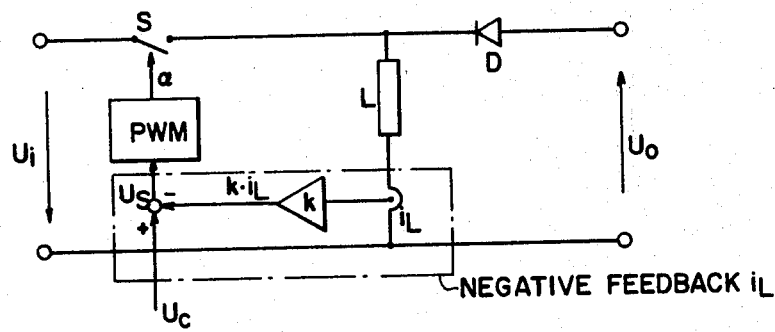
Figure 3A:
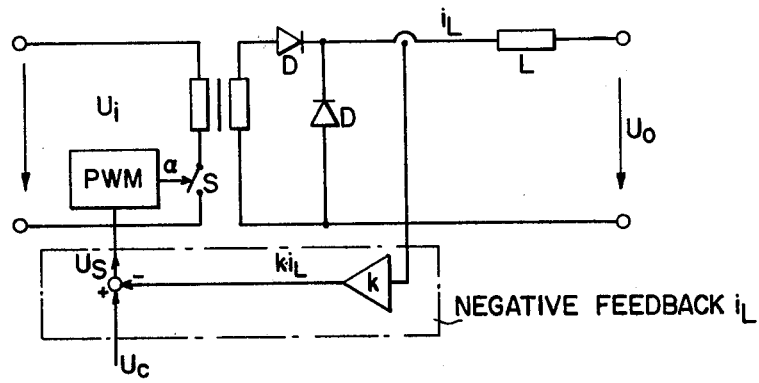
Figure 3B:
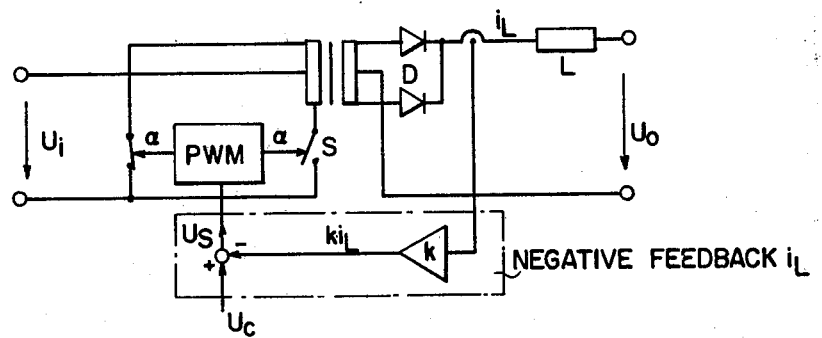
Figure 3C:
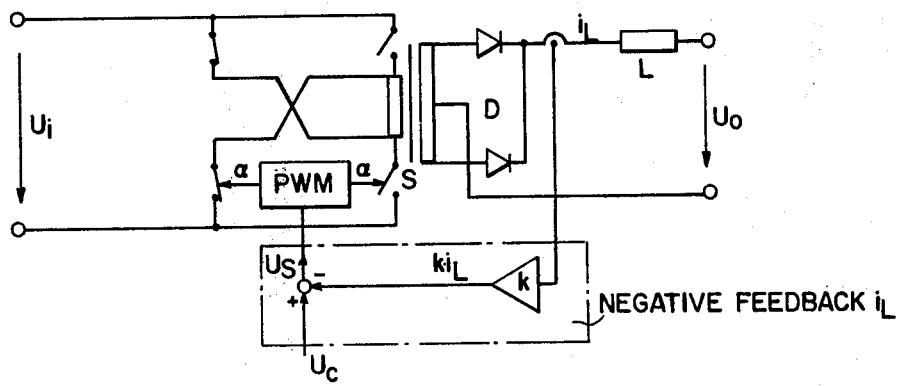

The basic circuit diagrams shown in FIGS. 1 through 3 showing switching regulator modules PS, all contain typical circuit components such as inductor L, free-wheeling diodes D, $D_1$, $D_2$, power switches S, $S_1$, $S_2$, pulse width modulators PWM, $PWM_1$, $PWM_2$, and are provided with negative feedback of the proportional inductor current $i_L$ in the amount of $k \cdot i_L$ toward the control potential $U_c$. The resulting signal S, $U_S$, $U_{S1}$, $U_{S2}$ obtained from $(U_c - k \cdot i_L)$ then control the pulse width modulator PWM.

In the case of parallel connection of several switching regulator modules PS controlled by a common error amplifier EA there is identical negative feedback k in each power stage $PS_1$, $PS_2$ of the inductor current $i_L$ to the common control potential $U_c$ of the error amplifier EA, then each module will experience an identical amplification of the DC component $\bar{i}_L$ of the inductor current $i_L$ as a function of the control potential $U_c$. Ideally, then is valid $$\bar{i}_{L1} = (1/k U_c = \bar{i}_{L2} \ldots = \bar{i}_{Ln}$$

Theoretically the amplification is independent of the operation frequency of the individual switching regulator module. Therefore the frequency may vary from module to module, this being a decisive advantage over the circuitries used heretofore.

It will be obvious to those skilled in the art that many modifications may be made within the scope of the present invention without departing from the spirit thereof, and the invention includes all such modifications.

What is claimed is:

1. In a circuit arrangement for defined current sharing between parallel-connected switching regulator modules in DC switching regulators with continuous inductor current and common error amplifiers for the purpose of generating regulated DC voltage from an unregulated voltage source, the improvement comprising means in each switching regulator module composed of an inductor, a semi-conductor switch, a free-wheeling diode, and a pulse-width modulator, whereby for the purpose of controlling the pulse-width modulator a signal proportional to the time-varying inductor current of the individual switching regulator module is negatively fed back to the output signal of the error amplifier and where the signal resulting therefrom is used to control the pulse-width of the corresponding switching regulator module.

2. A circuit arrangement according to claim 1 including means for using different operational frequencies for the individual parallel switching regulator modules.

3. A circuit arrangement according to claim 1 including having the same operational frequencies for the individual parallel switching regulator modules having uniform amounts of phase-shifts with respect to each other.

* * * * *